United States Patent
Verhoog et al.

[11] Patent Number: 6,042,961
[45] Date of Patent: Mar. 28, 2000

[54] SEALED ONE PIECE BATTERY HAVING A PRISM SHAPE CONTAINER

[75] Inventors: Roelof Verhoog, Bordeaux; Jean-Loup Barbotin, Pompignac, both of France

[73] Assignee: Alcatel, Paris, France

[21] Appl. No.: 08/943,314

[22] Filed: Oct. 14, 1997

[30] Foreign Application Priority Data

Sep. 15, 1997 [FR] France .................................. 97 11434

[51] Int. Cl.[7] .................................................. H01M 2/00
[52] U.S. Cl. ............................ 429/72; 429/148; 429/163; 429/176; 429/120
[58] Field of Search ............................... 429/120, 71, 72, 429/176, 148, 163

[56] References Cited

U.S. PATENT DOCUMENTS

| | | | |
|---|---|---|---|
| 4,107,402 | 8/1978 | Dougherty et al. | 429/120 |
| 4,275,131 | 6/1981 | Richards | 429/163 |
| 5,460,900 | 10/1995 | Rao et al. | 429/72 |
| 5,510,207 | 4/1996 | Grivel et al. | 429/120 |
| 5,569,552 | 10/1996 | Rao et al. | 429/72 |

FOREIGN PATENT DOCUMENTS

| | | |
|---|---|---|
| 0 596 778 A1 | 5/1994 | European Pat. Off. . |
| 0 596 794 A1 | 5/1994 | European Pat. Off. . |
| 2 742 002 A1 | 6/1997 | France . |
| 92 10 384 | 11/1992 | Germany . |

Primary Examiner—Maria Nuzzolillo
Assistant Examiner—Monique M. Wills
Attorney, Agent, or Firm—Sughrue, Mion, Zinn, Macpeak & Seas, PLLC

[57] ABSTRACT

A sealed one-piece battery having a prism-shaped container including:

a tank consisting of a single plastic material, a member fixed and sealed to the tank and to partitions on the side of the tank opposite the transverse wall to seal the tank, two flanges fixed and sealed to longitudinal walls defining flow compartments for a heat-conducting fluid, and two tubes on the transverse wall of the tank forming an inlet and an outlet for fluid common to the compartments.

20 Claims, 6 Drawing Sheets

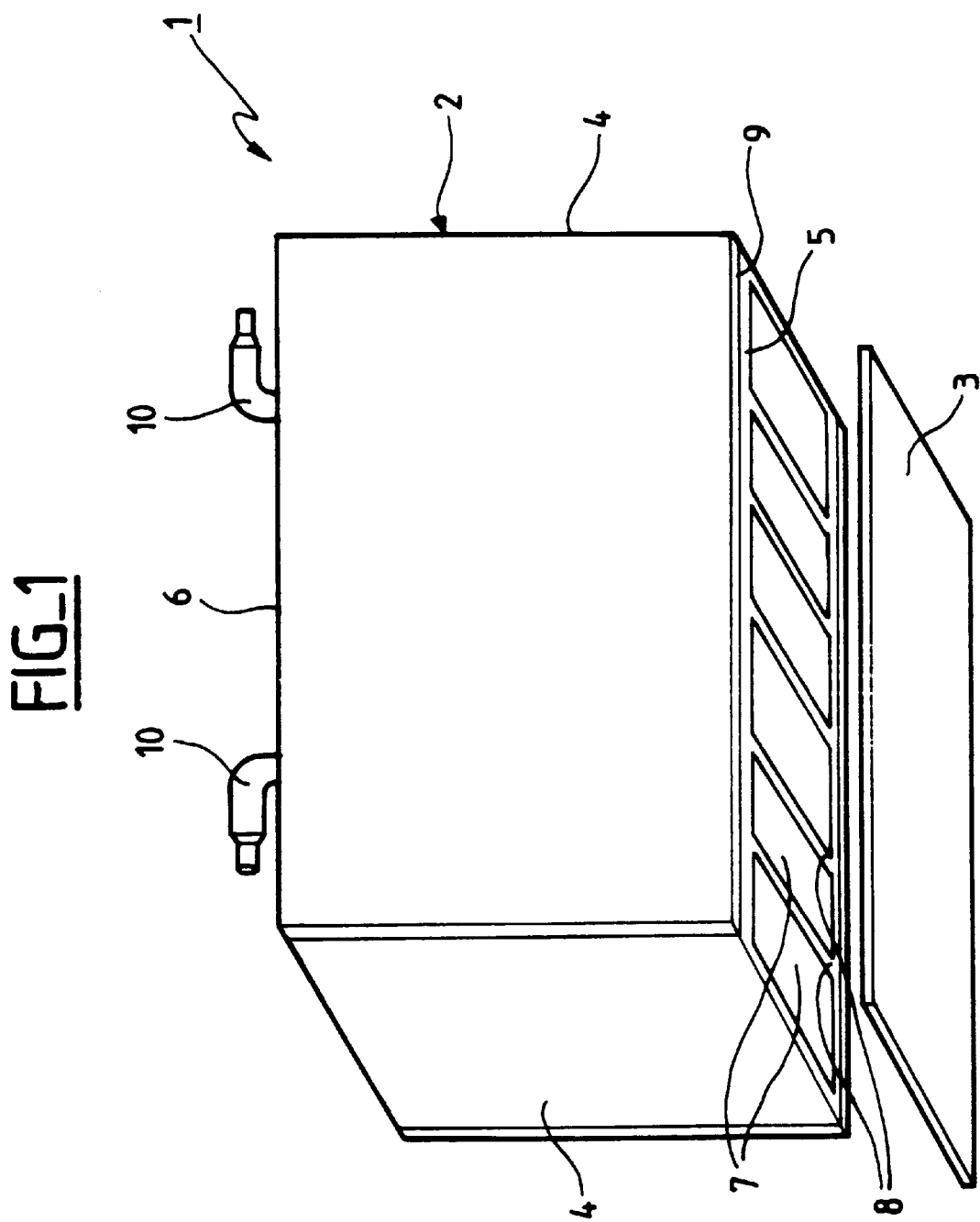

FIG_2
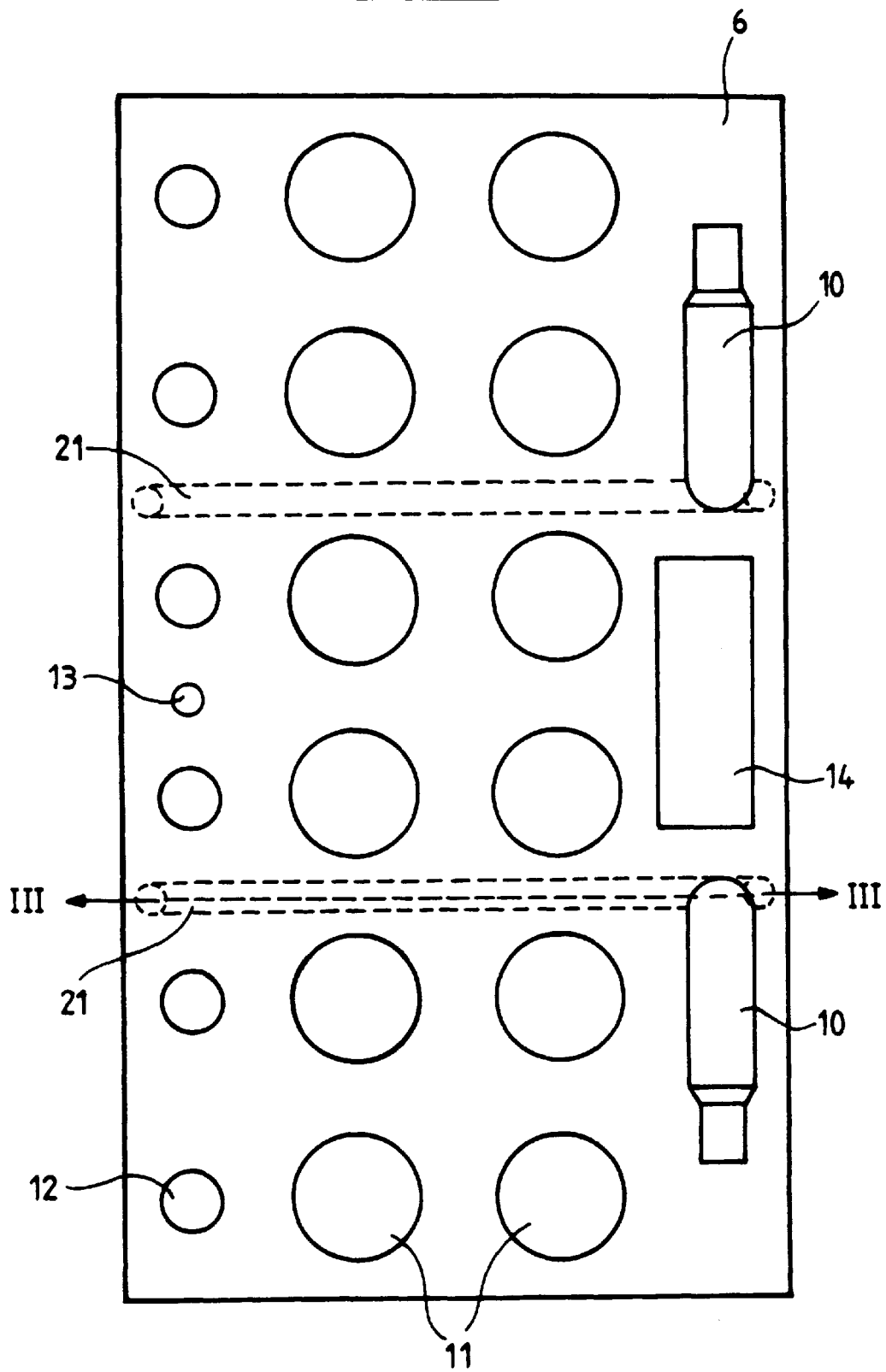

FIG_3
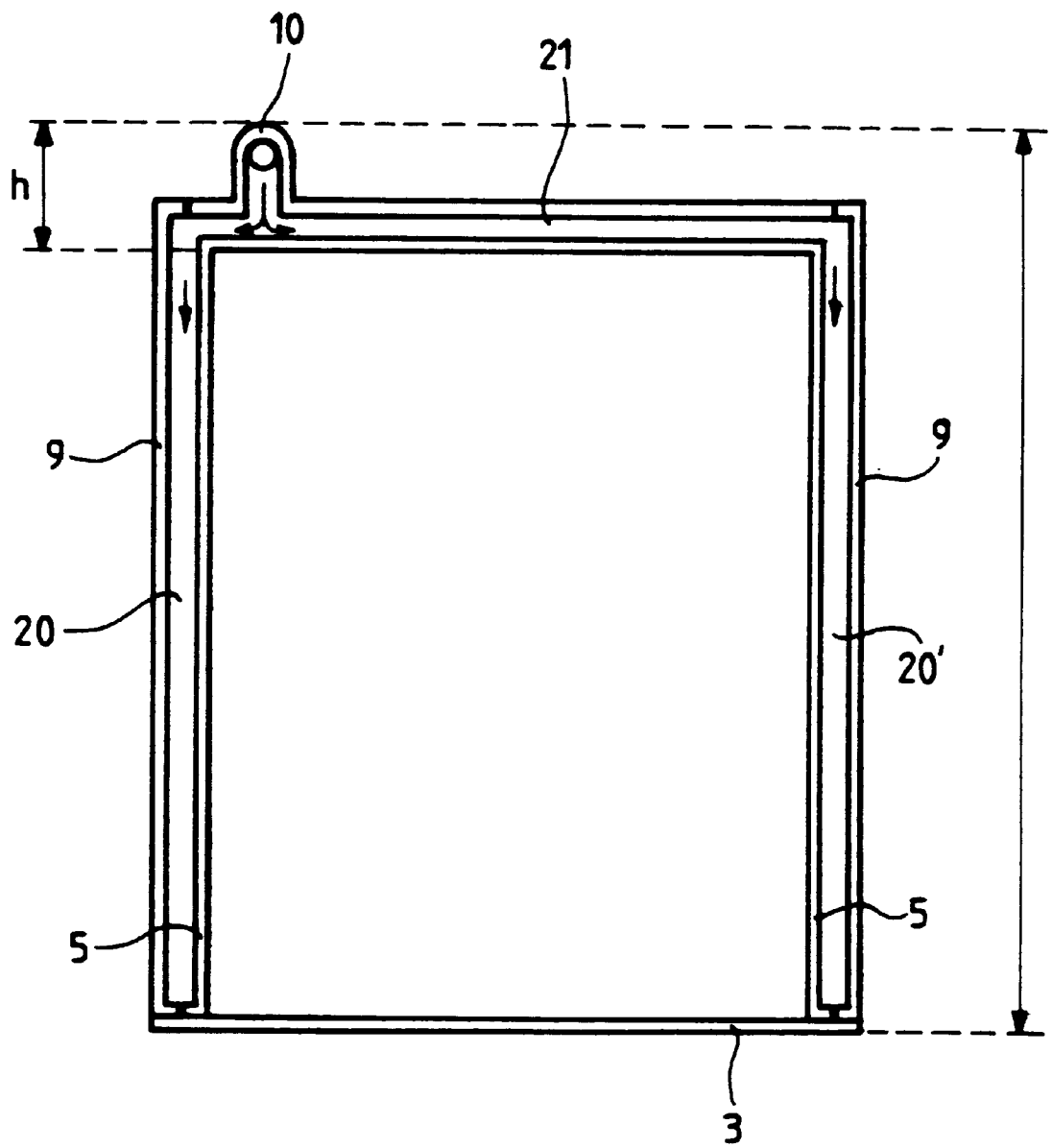

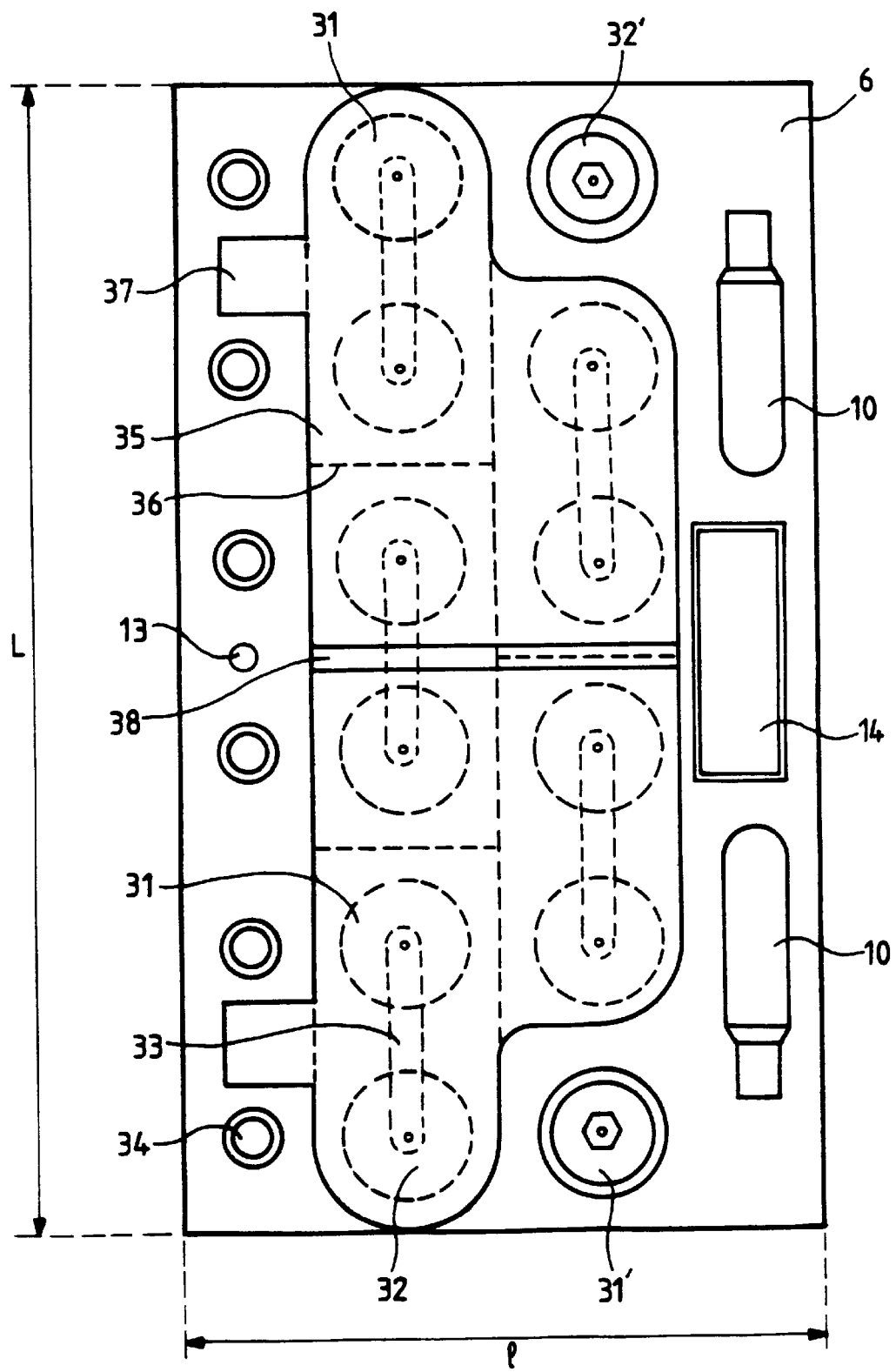
FIG_4

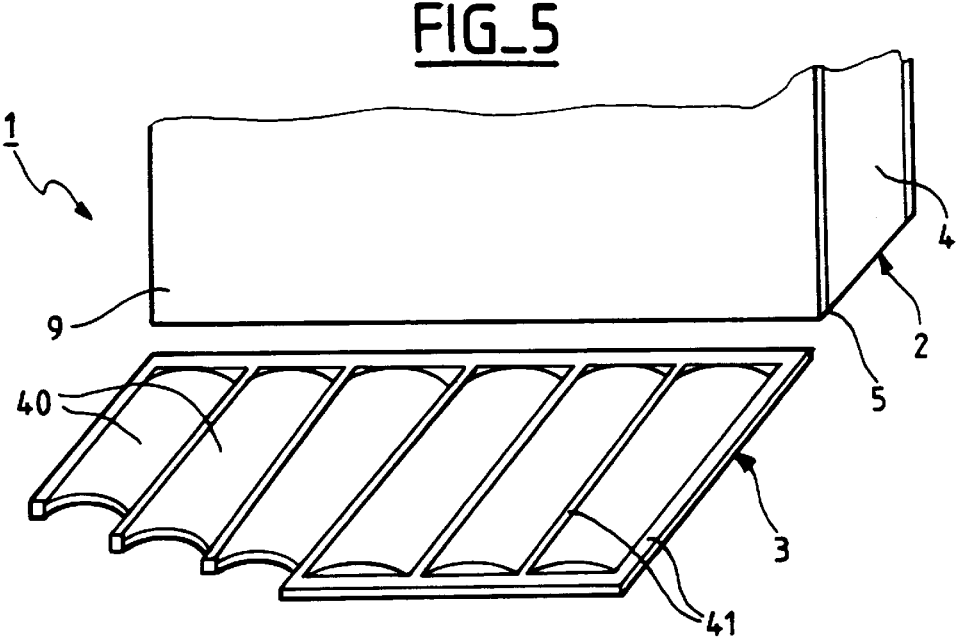
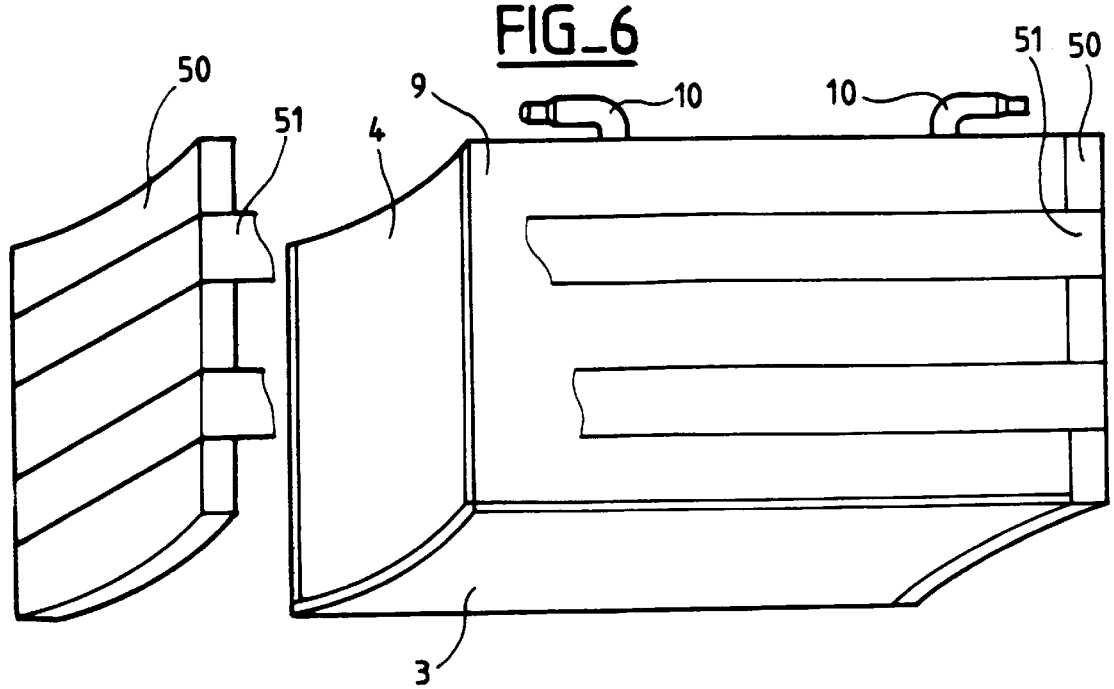

FIG_7
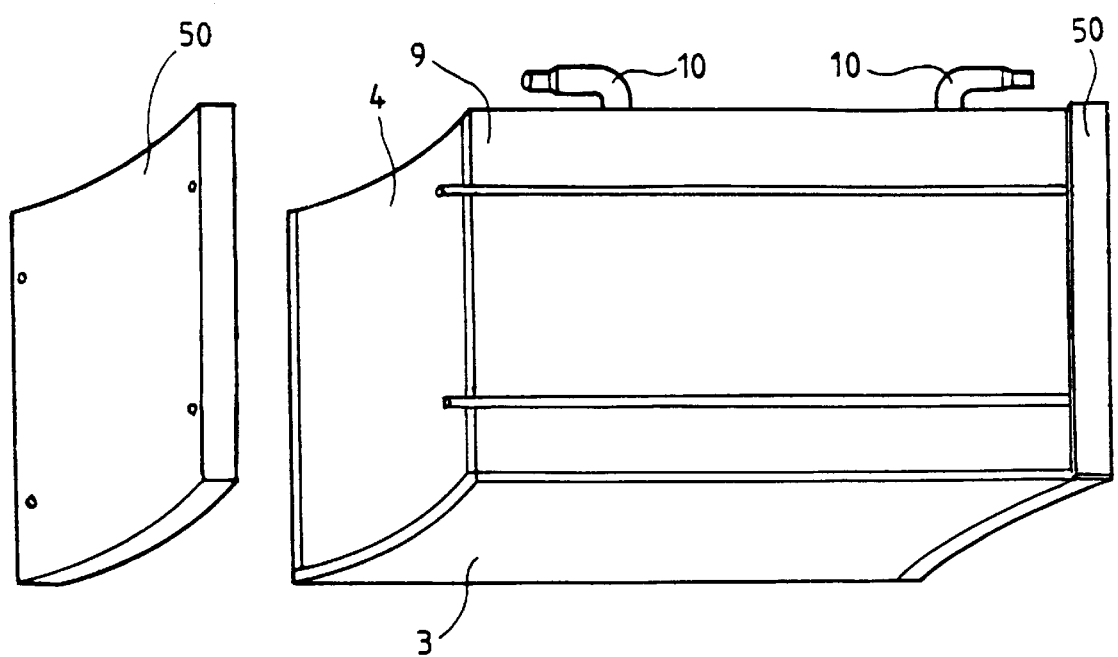

SEALED ONE PIECE BATTERY HAVING A PRISM SHAPE CONTAINER

The present invention concerns a one-piece battery provided with a temperature control device. In a one-piece design, the storage battery cells are contained in compartments of a single container, generally made of plastics material and prism-shaped. Each cell is an electrochemical stack consisting of an alternating assembly of positive and negative electrodes separated from each other by a separator.

A one-piece battery comprising a plastics material container provided with a cooling device using a circulating fluid is described in European patent application EP-0 596 778. The cooling device includes two flanges respectively welded and sealed to two opposite walls of the container, each of the flanges defining with the corresponding wall a flow compartment having at the top a fluid inlet orifice and a fluid outlet orifice.

A device of the above kind requires two connections per flow compartment, one for the fluid inlet and the other for the fluid outlet. When a plurality of one-piece batteries are associated with each other, the routing of these connections is complex and bulky (intersections, lengths of connector, etc) and their number makes the sealing of the cooling system as a whole less reliable.

Another thermal control system is described in European patent application EP-0 624 916. The liquid flow compartments are disposed in the partitions separating the compartments of the container and connected to a common inlet and outlet by longitudinal manifolds in an attached lid. These manifolds are in the form of pipes in a number of contiguous parts and each compartment is individually connected to the manifold.

The number of connections means that the reliability of this device is low. Also, the disposition of the liquid flow compartments and the presence of the two longitudinal ramps significantly increase the overall size of the battery and lead to congestion of the surface area available under the lid. To compensate the overall size of the cooling system the lid carries only two electrical terminals for connection to an external circuit. An arrangement of the above kind implies the use of an internal electrical connecting device which has to pass through and be sealed to the partition separating two contiguous compartments. In the case of a sealed battery with an alkaline electrolyte these devices are insufficiently reliable from the electrical and mechanical points of view to enable them to be used in an electric vehicle.

An aim of the present invention is to propose a one-piece battery provided with a thermal control device of smaller overall size and of increased reliability.

The present invention consists in a sealed one-piece battery having a prism-shaped container including:
  a tank consisting of a single plastics material member having two lateral walls, two longitudinal walls, a transverse wall and at least one vertical partition perpendicular to said longitudinal walls dividing said tank into two compartments adapted to receive an electrochemical stack,
  closure means for said tank comprising a member fixed and sealed to said tank and to said partition on the side opposite the transverse wall,
  two flanges fixed and sealed to each of said longitudinal walls defining with said wall a flow compartment for a heat-conducting fluid,
  two tubes on said transverse wall of said tank and communicating via passages incorporated in said transverse wall, forming an inlet and an outlet for said fluid common to said compartments,
  two orifices per compartment, opening to the interior of the container, placed side by side on said transverse wall, grouped in a central strip parallel to said longitudinal walls and adapted to receive electrical terminals, and
  one open orifice per compartment on said transverse wall in a lateral strip parallel to said central strip, on the side opposite said tubes and adapted to receive a release valve for venting gas in the event of a pressure rise.

The container of the battery of the invention is molded in one piece, including the partitions separating the compartments. Each longitudinal wall carries an independent compartment delimited by flanges and within which a fluid flows. The compartments are connected at the fluid inlet and the fluid outlet, the flow of the fluid within each compartment remaining autonomous. The connection between the compartments of the same one-piece battery is provided within the thickness of the transverse wall, for example in the form of a hollow tube. This arrangement confers on the one-piece battery of the present invention the following main advantages: the absence of connections totally eliminates the risk of leakage of the heat-conducting fluid and the device has a smaller overall size.

The one-piece battery includes a positive terminal and a negative terminal for each compartment receiving a storage battery cell. This avoids the need to use an internal device for the electrical connection, requiring a sealed passage through the partition. This renders the battery more reliable from the electrical point of view, in particular by eliminating leakage currents between two electrochemical stacks contained in adjacent compartments. The arrangement of the terminals in pairs forming a strip minimizes the length of the connections required to interconnect the cells electrically.

After the electrochemical stacks are inserted into each of the compartments and after fitting terminals pre-connected to the stack into the orifices provided for them, the container is closed by a member that then constitutes the bottom of the one-piece battery. The closure member is fixed not only to the lateral and longitudinal walls of the container but also to each compartment. In this way each compartment is sealed. The member can be glued or welded on, for example.

Each compartment is provided with a relief valve. The valves are fitted after fixing the closure member and filling each compartment with electrolyte through the orifices adapted to receive the valves.

In one variant, said transverse wall also carries at least one closed cavity adapted to receive temperature measuring means, said cavity being situated between two of the orifices adapted to receive said valves. To preserve the seal of the battery, this cavity must not open into a compartment.

In another variant, said transverse wall further carries a closed housing situated between said tubes. This housing is adapted to contain electrical connectors for connecting the battery to an external circuit, for example, or electronic components for controlling and monitoring the one-piece battery. These electronic components are those described in European patent application EP-0 623 828, for example.

In one particular embodiment of the invention all the parts of said container (tank, flanges and bottom) are made from plastics material, preferably the same material. The plastics material used is, for example, polyamide 6 (PA6) , polyamide 11 (PA11) , polyamide 12 (PA12), polypropylene oxide (PPO), polysulfone (PSU), polyethersulfone (PES), styrene/acrylonitrile copolymer (SAN), acrylonitrile/butadiene/styrene terpolymer (ABS), polypropylene (PP), a copolymer of the above or an alloy of polymers such as that described in European patent application EP-0 736 916, for example.

Production engineering is facilitated by welding the component parts together: infrared welding, heating mirror welding (also known as heat-welding), vibration welding or ultrasonic welding if the materials lend themselves to this. In some cases, assembly by gluing is possible.

The pairs of orifices adapted to receive the electric terminals are aligned to form a strip at the center of the transverse member. In another particular embodiment of the invention, the width of said central strip is in the order of half the width of said transverse wall. The orifices adapted to receive the valves and the closed cavity, where applicable, are aligned along the central strip on one side of the transverse member. The tubes, possibly surrounding a housing, are on the opposite side.

The length of the transverse wall depends on the number of cells and therefore on the number of compartments in the one-piece battery. The width of said transverse wall is at least equal to 70 mm and at most equal to 180 mm. For a narrower transverse wall the volume occupied by the fluid flow compartments represents too much of a penalty in terms of the energy per unit mass of the one-piece battery. If the width of the transverse wall is greater, the flow compartments are too far apart for the transfer of heat to be sufficiently effective at the center of the compartments.

The envelope of said transverse wall preferably has a height at most equal to 40 mm, preferably less than 30 mm. The overall size of the one-piece battery of the present invention is therefore very much less than that of prior art batteries. Moreover, the assembly of the battery is optimized by the chosen position of the heat-conducting fluid inlets/outlets.

In accordance with a further feature of the invention, a cover fixed and sealed to said transverse wall covers said terminals except for two terminals of opposite polarity adapted to be connected to external connections. Said cover is advantageously welded and sealed around each pair of terminals of opposite polarity each belonging to one of two different compartments and interconnected electrically, which reduces the risk of gas leakage.

The electrical connection of the parameter (temperature, voltage, pressure, etc) measuring circuits of the one-piece battery, either to an external circuit or to another neighboring one-piece battery, can entail routing wires from one side of the transverse member to the other. In one variant, said cover carries means for holding longitudinal wires in place, said means comprising lateral lugs projecting from said cover parallel to said transverse wall. In another variant, said cover carries means for guiding transverse wires in the form of transverse channels formed on the surface of the cover.

In accordance with another further feature of the invention, said closure means comprise a plastics material component of generally plane shape each surface portion of which delimited by the periphery of a compartment has a concave side facing towards the outside of said battery. Each compartment of a sealed battery can in operation be at a pressure at least 1 bar greater than the external pressure, the valve having a tripping pressure that is generally between 1 bar and 3 bars. This pressure exerts on the bottom of the container in particular a force that tends to deform it. For the deformation not to extend as far as the exterior of the envelope of the battery, the surface closing each compartment has a profile adapted to compensate such deformation.

In accordance with another further feature of the invention, the one-piece battery is held by a chassis made up of two plates held by at least one strap or linked by tie-rods, the plates being in contact with said lateral walls. The chassis and the straps or tie-rods are usually of metal. The chassis improves the mechanical strength of the one-piece battery. It can also be used to assemble a plurality of one-piece batteries together. Said plates preferably have a concave side facing towards the outside of said battery. Said lateral walls preferably have a concave side facing outwards that espouses the shape of said plates.

The one-piece battery of the present invention is used in particular for vehicle starting and traction applications (railroads, road vehicles such as automobiles or two-wheel vehicles, etc) and emergency power applications (lighting, railroad). The one-piece design yields a significant improvement of energy per unit volume and per unit mass that is particularly advantageous in the case of an electric vehicle. It can be a lead, nickel or lithium storage battery.

Other features and advantages of the present invention will emerge from the following embodiment given by way of non-limiting illustrative example and from the accompanying drawings, in which:

FIG. 1 is a perspective bottom view of the container of a one-piece battery of the invention, FIG. 2 is a diagrammatic top view of the container of a one-piece battery of the invention, FIG. 3 is a diagrammatic sectional view of the battery taken along the line III—III in FIG. 2, FIG. 4 is analogous to FIG. 2 for a one-piece battery of the invention, FIG. 5 shows a variant of the closure member, FIG. 6 shows one example of a one-piece battery chassis, FIG. 7 shows another example of a one-piece battery chassis, held together by tie rods.

FIG. 1 shows the container 1 of a nickel-hydridable metal one-piece battery of the present invention having a capacity of 120 Ah and a voltage of 7.2 V. The prism-shaped container 1 comprises a polypropylene tank 2 and closure means 3 constituting a bottom. The tank 2 comprises two lateral walls 4, two longitudinal walls 5 and a transverse wall 6. It is divided into six compartments 7 by partitions 8. Each compartment 7 is adapted to contain one storage battery cell, i.e. one electrochemical stack consisting of an alternating assembly of positive and negative electrodes separated from each other by a separator. The bottom 3 is designed to be heat-welded to the tank 2 when the storage battery cells have been inserted into their respective compartments.

Flanges 9 are welded to the walls 5 to form a heat-conducting fluid flow compartment. The thickness of the flow compartment with the flange is approximately 2 mm to 4 mm. The transverse wall 6 carries tubes 10 for entry and exit of the fluid.

The orifices 11 adapted to receive the terminals are disposed alongside each other in pairs to form a strip at the center of the wall 6, as shown in FIG. 2. The orifices 12 that receive the valves are aligned lengthwise of the central strip, on the side opposite the tubes 10.

A closed cavity 13 can additionally be provided to receive a device for measuring the internal temperature of the one-piece battery. To limit the overall size the cavity 13 is preferably situated between two orifices 12.

A closed housing 14 can be formed within the thickness of the transverse wall 6, between the tubes 10, for example to contain electronic components for controlling and monitoring the one-piece battery.

FIG. 3 is a diagrammatic sectional view taken along the line III—III. The flange 9 is heat-welded to each wall 5 delimiting a space 20, 20' adapted to receive a circulating heat-conducting fluid in order to cool or to heat the battery as required. An analogous system is described in European patent application EP-0 596 778. Air or a liquid can be used for cooling, for example. The cooling liquid is a mixture of water and ethylene-glycol, for example. The compartments 20, 20' communicate via a passage 21 with a common tube 10, for example for entry of the fluid.

FIG. 4 shows a top view of the battery in accordance with the invention fitted with the terminals and the valves after insertion of the electrochemical stacks into the compartment and filling with electrolyte. The alternately positive and negative terminals 31 and 32 can be seen, with one terminal of each polarity for each compartment disposed alongside each other in pairs at the center of the wall 6. A positive terminal 31 of a first compartment is connected to a negative terminal 32 of a neighboring second compartment by a plane connection 33.

Each compartment is provided with a pressure relief valve 34. In a sealed alkaline storage battery the relative pressure at which the valve trips is usually between 1 bar and 3 bars, most often in the order of 2 bars.

The terminals 31, 32 are covered with a cover 35 except for one positive terminal 31' and one negative terminal 32' preferably situated near ends of the wall 6. The terminals 31', 32' do not carry any connection 33 and are adapted to be electrically connected to an external circuit. The cover 35 is heat-welded and sealed to the wall 6. The heat-welding is carried out in such a way that each pair of terminals 31, 32 connected by a connection 33 is surrounded by a closed continuous heat-welding bead 36.

To facilitate handling of the one-piece battery, lateral lugs 37 project from the cover 35 parallel to the wall 6. Wires running longitudinally of the battery can be located in the space between these lugs and the wall 6 in order to hold them in place. With the same aim in view, one or more transverse channels 38 can be provided in the top face of the cover 35 to guide wires running in this direction.

A module containing electronic components, for example, is installed in the housing 14. The height of the module must be such that, once installed in the housing 14, its elevation above the wall 6 does not exceed the height of the envelope of the transverse wall fitted.

The one-piece battery shown has a length L of 250 mm and a width l of 120 mm; its total height H is 200 mm. The total height h of the envelope of the transverse wall fitted including the cover is 25 mm.

Figure 5 shows a variant of the invention in which the bottom 3 of the container 1 has six surfaces 40 corresponding to the six compartments 7 of the battery. The surfaces 40 are delimited by plane areas 41 that are heat-welded to the walls 4, 5 of the tank and the corresponding partitions 8. The surfaces 40 have a rounded shape with the concave side facing towards the outside of the battery. Accordingly, slight deformation (in the order of 1 mm) due to the internal pressure rise remains with the envelope of the one-piece battery.

The one-piece battery can be surrounded by a metal chassis to increase its mechanical strength and to facilitate grasping it. FIG. 6 shows a one-piece battery and its chassis comprising two plates 50 retained by two straps 51, the plates 50 being disposed at each end of the battery in contact with the lateral walls 4.

The plates 50 have a thickness between 1 mm and 20 mm, preferably between 4 mm and 15 mm, depending on the width of the electrochemical stack. To avoid an excessive increase in the weight of the one-piece battery, it is advantageous to provide apertures in the core of the plates 50 with ribs between the two faces to maintain the stiffness of the plate.

The plates 50 and the straps 51 are preferably made of metal for greater mechanical strength, for example of aluminum alloy, stainless steel, protected steel or a composite material. When the plates 50 are linked by tie-rods, the same materials can be used.

It is advantageous for the plates 50 to have a concave side facing towards the outside of the battery and for the lateral walls 4 to have a concave side facing towards the outside that espouses the shape of plates 50. The deformation due to the swelling of the electrochemical stacks is between 5% and 20% of the thickness of the plates 50, for example approximately 1 mm for plates 9.5 mm thick. Accordingly, the deformation remains with the envelope of the one-piece battery.

We claim:

1. Sealed one-piece battery having a prism-shaped container (1) including:
    a tank (2) comprised of a single plastics material member having two lateral walls (4), two longitudinal walls (5), a transverse wall (6) and at least one vertical partition (8) perpendicular to said longitudinal walls (5) dividing said tank (2) into at least two compartments (7) adapted to receive an electrochemical stack,
    a member (3) fixed and sealed to said tank (2) and to said at least one vertical partition (8) on the side of the tank opposite the transverse wall (6), to close the tank,
    two flanges (9) each fixed and sealed to a respective one of said longitudinal walls (5) thereby defining a flow compartment (20) for a heat-conducting fluid,
    a tube (10) on said transverse wall (6) of said tank (2) and in communication with a passage (21) incorporated in said transverse wall (6), wherein said passage (21) is in communication with both of said compartments (20).

2. One-piece battery according to claim 1, further comprising:
    two orifices (11) per compartment (7), opening to the interior of the container, placed side by side on said transverse wall (6) and grouped in a central strip parallel to said longitudinal walls (5), adapted to receive electrical terminals, and
    one open orifice (12) per compartment (7) on said transverse wall (6) in a lateral strip parallel to said central strip, on the side opposite said tube (10) and adapted to receive a release valve for venting gas in the event of a pressure rise.

3. One-piece battery according to claim 2 wherein said transverse wall further carries at least one closed cavity (13) adapted to receive temperature measuring means, said cavity being situated between two orifices (12) adapted to receive said valves.

4. One-piece battery according to claim 2 wherein said transverse wall further carries a closed housing (14) situated between said tubes.

5. One-piece battery according to claim 2 wherein the width of said central strip is in the order of half the width of said transverse wall.

6. One-piece battery according to claim 1 wherein all parts of said container are made from plastics material.

7. One-piece battery according to claim 1 wherein the width of said transverse wall is at least equal to 70 mm and at most equal to 180 mm.

8. One-piece battery according to claim 1 wherein the envelope of said transverse wall has a height at most equal to 40 mm.

9. One-piece battery according to claim 1 wherein a cover (35) fixed and sealed to said transverse wall covers said terminals (31, 32) except for two opposite polarity terminals (31', 32') adapted to be connected to external connections.

10. One-piece battery according to claim 1 wherein said closure means comprise a generally plane plastics material member each surface portion (40) of which delimited by the periphery of a compartment has a concave side facing towards the outside of said battery.

11. One-piece battery according to claim 9 wherein said cover is welded and sealed around each pair of opposite polarity terminals each belonging to one of two different compartments and electrically connected.

12. One-piece battery according to claim 9 wherein said cover carries means for holding longitudinal wires in place, said means comprising lateral lugs (37) projecting from said cover parallel to said transverse wall.

13. One-piece battery according to claim 9 wherein said cover carries means for guiding transverse wires consisting of transverse channels (38) formed on the surface of the cover.

14. One-piece battery according to claim 1 retained by a chassis comprising two plates (50) disposed in contact with said lateral walls and retained by at least one strap (51).

15. One-piece battery according to claim 14 wherein said plates have a concave side facing towards the outside of said battery.

16. One-piece battery according to claim 15 wherein said lateral walls have a concave side facing outwards that espouses the shape of said plates.

17. One-piece battery according to claim 1 retained by a chassis comprising two plates disposed in contact with said lateral walls and connected by tie-rods.

18. One-piece battery according to claim 1, further comprising:

a second tube (10) on said transverse wall (6) of said tank (2) and in communication with a second passage (21) incorporated in said transverse wall (6), wherein said second passage (21) is in communication with both of said compartments (20).

19. One-piece battery according to claim 18, wherein said tube (10) comprises a fluid inlet, and said second tube (10) comprises a fluid outlet.

20. One-piece battery according to claim 1, wherein said passage (21) is connected to said tube (10) and said compartments (20) such that the fluid flow passage through each compartment (20) is autonomous from that in the other.

* * * * *